(12) United States Patent
Wong et al.

(10) Patent No.: US 12,047,151 B2
(45) Date of Patent: Jul. 23, 2024

(54) COMMUNICATIONS DEVICE, INFRASTRUCTURE EQUIPMENT AND METHODS

(71) Applicant: Sony Group Corporation, Tokyo (JP)

(72) Inventors: Shin Horng Wong, Basingstoke (GB); Martin Warwick Beale, Basingstoke (GB); Brian Alexander Martin, Basingstoke (GB); Vivek Sharma, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/230,705

(22) Filed: Aug. 7, 2023

(65) Prior Publication Data

US 2023/0379034 A1 Nov. 23, 2023

Related U.S. Application Data

(63) Continuation of application No. 17/712,270, filed on Apr. 4, 2022, now Pat. No. 11,736,174, which is a
(Continued)

(30) Foreign Application Priority Data

Nov. 11, 2016 (EP) ..................... 16198547

(51) Int. Cl.
*H04B 7/02* (2018.01)
*H04B 7/0408* (2017.01)
(Continued)

(52) U.S. Cl.
CPC ......... *H04B 7/0695* (2013.01); *H04B 7/0408* (2013.01); *H04B 7/063* (2013.01);
(Continued)

(58) Field of Classification Search
CPC .... H04B 7/0695; H04B 7/0408; H04B 7/063; H04B 7/0632; H04B 7/088; H04B 7/0888
(Continued)

(56) References Cited

U.S. PATENT DOCUMENTS

2014/0295842 A1 10/2014 Choi et al.
2016/0013858 A1 1/2016 Jalali et al.
(Continued)

FOREIGN PATENT DOCUMENTS

CN 1479465 A 3/2004

OTHER PUBLICATIONS

International Search Report and Written Opinion mailed on Jan. 26, 2018 for PCT/EP2017/077977 filed on Nov. 1, 2017, 14 pages.
(Continued)

*Primary Examiner* — Zewdu A Kassa
(74) *Attorney, Agent, or Firm* — XSENSUS LLP

(57) ABSTRACT

A method of transmitting data to a communications device from a wireless communications network comprising one or more infrastructure equipment, the method comprises configuring one or more of the infrastructure equipment for transmitting one or more candidate beams of signals which can be used to transmit the data to the communications device from each of one or more cells of the wireless communications device formed by the infrastructure equipment. Each of the candidate beams is configured with a different directional bias with respect to a location of the one or more cells from which the signals of the candidate beam can be received when transmitted.

20 Claims, 5 Drawing Sheets

Related U.S. Application Data continuation of application No. 16/346,137, filed as application No. PCT/EP2017/077977 on Nov. 1, 2017, now Pat. No. 11,296,770.

(51) Int. Cl.
*H04B 7/06* (2006.01)
*H04B 7/08* (2006.01)

(52) U.S. Cl.
CPC ........... *H04B 7/0632* (2013.01); *H04B 7/088* (2013.01); *H04B 7/0888* (2013.01)

(58) Field of Classification Search
USPC .................. 375/267, 260, 259, 316, 295
See application file for complete search history.

(56) References Cited

U.S. PATENT DOCUMENTS

| | | |
|---|---|---|
| 2016/0066197 A1 | 3/2016 | Park et al. |
| 2016/0080060 A1 | 3/2016 | Yu et al. |
| 2016/0183234 A1 | 6/2016 | Sung et al. |
| 2019/0261287 A1* | 8/2019 | Deenoo ............. H04W 52/0216 |
| 2021/0234600 A1* | 7/2021 | Vieira .................. H04W 16/28 |

OTHER PUBLICATIONS

Holma et al., "LTE for UMTS OFDMA and SC-FDMA Based Radio Access", Wiley 2009, System Architecture Based on 3GPP SAE, 11 pages.

3GPP, "Support for Beam Based Common Control Plane", Nokia, Alcatel-Lucent Shanghai Bell, 3GPP TSG-RAN WG1#85, RAN1#85, R1-165364, May 23-27, 2016, pp. 1-5.

Samsung, "DL Beam Management in the Multi-Beam based NR system," 3GPP TSG-RAN WG2 Meeting #95bis, R2-166391, Oct. 2016, pp. 1-5.

NTT Docomo, "New SID Proposal: Study on New Radio Access Technology," 3GPP TSG RAN Meeting #71, RP-160671, Mar. 2016, 8 pages.

MediaTek Inc., "RLM and RLF in HF NR," 3GPP TSG-RAN WG2 Meeting #96, R2-168130, Nov. 14-18, 2016, pp. 1-5.

\* cited by examiner

Beamformed coverage vs non-beamformed coverage

Beam sweeping

Set of candidate beams

UE specific candidate beams

COMMUNICATIONS DEVICE, INFRASTRUCTURE EQUIPMENT AND METHODS

CROSS-REFERENCE TO RELATED APPLICATIONS

The present application is a continuation of U.S. application Ser. No. 17/712,270, filed Apr. 4, 2022, which is a continuation of U.S. application Ser. No. 16/346,137, filed Apr. 30, 2019 (now U.S. Pat. No. 11,296,770), which is based on PCT filing PCT/EP2017/077977 filed Nov. 1, 2017, which claims priority to EP 16198547.8 filed Nov. 11, 2016, the entire contents of each are incorporated herein by reference.

BACKGROUND

Field of the Present Technique

The present disclosure relates to communications devices which are configured to receive data transmitted from a wireless communications network, in which the infrastructure equipment are configured to transmit the data as one or more beams of signals, each with a different directional bias with respect to the communications device. Correspondingly, the present technique relates to infrastructure equipment and wireless communications network, which are configured to transmit signals to communications device as beams of signals and methods for the same.

The present application claims the Paris Convention priority of European patent application EP16198547.8, the contents of which are hereby incorporated by reference.

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio access technology (which may be denoted new RAT or, simply, NR) networks, to support efficiently connectivity for a wide range of devices associated with different applications with different characteristic data traffic profiles, resulting in different devices having different operating characteristics and/or requirements.

The introduction of new radio access technology (RAT) systems/networks therefore gives rise to new challenges as well as opportunities. One such opportunity is use beam forming as effectively as possible to communicate data to communications devices.

SUMMARY OF THE PRESENT TECHNIQUE

The present disclosure can help address or mitigate at least some of the issues discussed above. As such, embodiments of the present technique can provide a method of transmitting data to a communications device from a wireless communications network including one or more infrastructure equipment. The method comprises configuring one or more of the infrastructure equipment for transmitting one or more candidate beams of signals which can be used to transmit the data to the communications device from each of one or more cells of the wireless communications device formed by the infrastructure equipment, each of the candidate beams being configured with a different directional bias with respect to a location of the one or more cells from which the signals of the candidate beam can be received when transmitted, determining whether each of the one or more candidate beams is to form either a serving beam with which the data can be transmitted by one or more of the infrastructure equipment to be received by the communications device or a fallback beams from which the data can be transmitted by the infrastructure equipment and received by the communications device instead of or in addition to one or more serving beams, and in accordance with predetermined conditions switching one of the fallback beams to be a serving beam.

Embodiments of the present technique can provide an arrangement in which a communications device can identify a set of beams for receiving data transmitted from a wireless communications network. The set of beams comprises one or more serving beams which are used to transmit data to the communications device and one or more fallback beams which can be used instead of one or more of the serving beams or in addition to the one of more serving beams when predetermined conditions are satisfied. The one or more serving beams and the one or more fallback beams may be formed from different cells of the wireless communications network. The predetermined conditions may include performing measurements to evaluated signals received from the one or more serving beams and/or the one or more fallback beams, such as comparing the evaluated signals (RSRP or RSRQ) with a predetermined threshold. By providing fallback beams in addition to the serving beams as a set used by the communications device and the wireless communications network, there is a greater likelihood of successfully communicating the data to the communications device, because the wireless communications network can switch one of the fallback beams to a serving beam if radio conditions for receiving the data at the communications device change.

Embodiments of the present technique can apply equally to the uplink and the downlink, so that a communications device may form a set of beams for transmitting data to the wireless communications network, which includes one or more serving beams and one or more fallback beams.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description of example embodiments with reference to the accompanying drawings wherein like reference numerals designate identical or corresponding parts throughout the several views, and wherein.

DESCRIPTION OF EXAMPLE EMBODIMENTS

As mentioned above the embodiments of the present invention can find application with advanced wireless communications systems such as those referred to as 5G or New Radio Access Technology (NR). New Radio Access Technology has been proposed in [2] to develop a new Radio Access Technology (RAT) for the next generation wireless communication system, i.e. 5G. The new RAT is expected to operate in a large range of frequencies, from hundreds of MHz to 100 GHz and it is expected to cover a broad range of use cases. The use cases that are considered can include:

Enhanced Mobile Broadband (eMBB)
Massive Machine Type Communications (mMTC)
Ultra Reliable & Low Latency Communications (URLLC)

Figure 1:
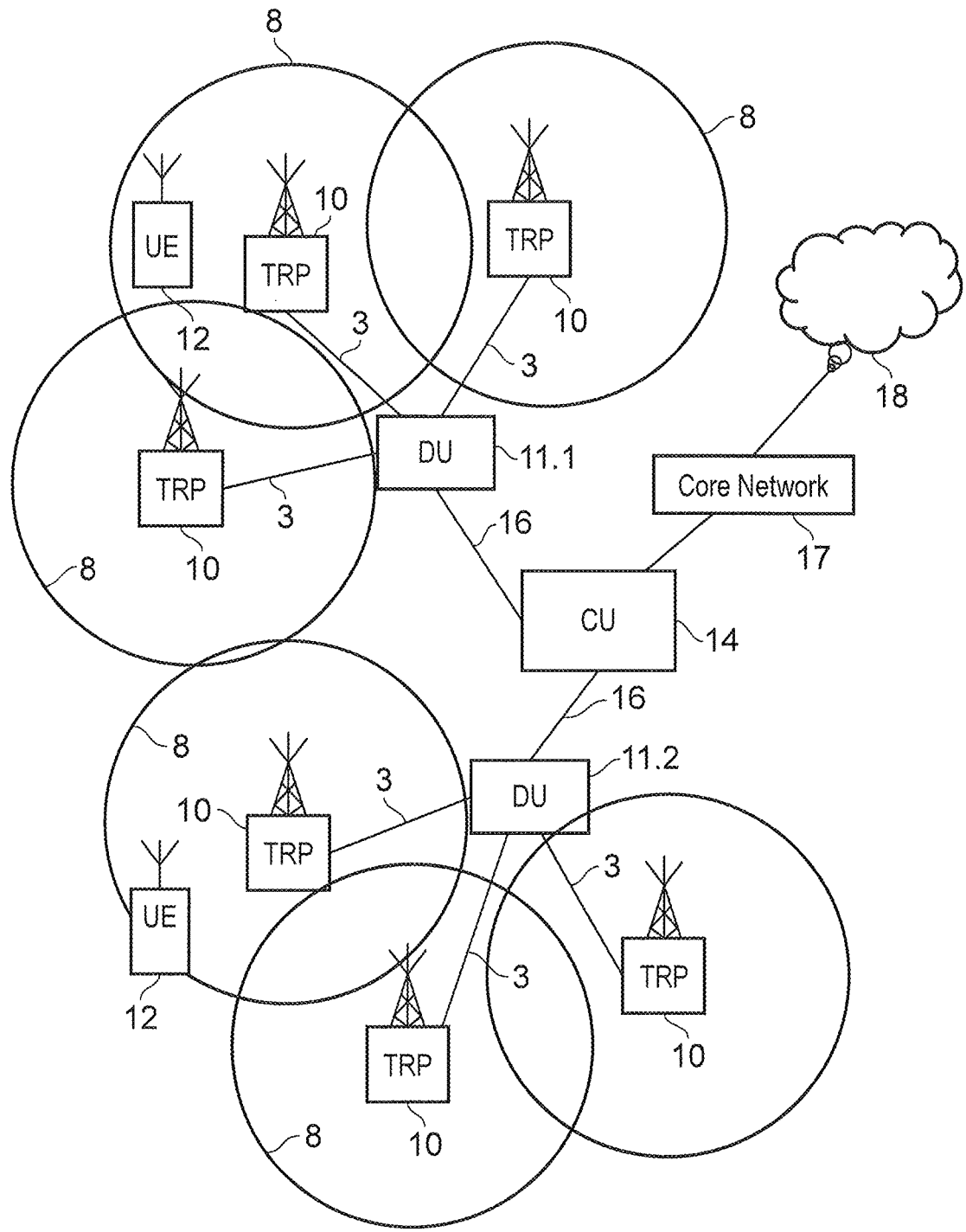
FIG. 1 is a schematic block diagram of a wireless communications system with architectural components corresponding to that of an example enhanced new radio or 5G network.

The aim of 5G is not only mobile connectivity for people, but to provide ubiquitous connectivity for any type of device and any type of application that would benefit from being connected. Many requirements and use-cases are still being discussed, but amongst those are:

Low latency
High data rates
Millimetre wave spectrum use
High density of network nodes (e.g. small cell and relay nodes)
Large system capacity
Large numbers of devices (e.g. MTC devices/Internet of Things devices)
High reliability (e.g. for vehicle safety applications, such as self-driving cars).
Low device cost and energy consumption
Flexible spectrum usage
Flexible mobility An example configuration of a wireless communications network which uses some of the terminology proposed for NR and 5G is shown in FIG. 1. In FIG. 1 a plurality of transmission and reception points (TRP) 10 are connected to distributed control units (DU) 11.1, 11.2 by a connection interface represented as a line 3. Each of the transmitter receiver points (TRP) 10 is arranged to transmit and receive signals via a wireless access interface within a radio frequency bandwidth available to the wireless communications network. Thus within a range for performing radio communications via the wireless access interface, each of the TRP 10, forms a cell of the wireless communications network as represented by a dashed line 8. As such wireless communications devices 12 which are within a radio communications range provided by the cells 10 can transmit and receive signals to and from the TRP 10 via the wireless access interface. Each of the distributed control units 11.1, 11.2 are connected to a co-ordinating unit (CU) 14 via an interface 16. The CU 14 is then connected to the a core network 17 which may contain all other functions required for communicating data to and from the wireless communications devices and the core network 17 may be connected to other networks 18.

The elements of the wireless access network shown in FIG. 1 may operate in a similar way to corresponding elements of an LTE network well-known and defined in the relevant standards administered by the 3GPP (RTM) body, and also described in many books on the subject, for example, Holma H. and Toskala A [1]. It will be appreciated that operational aspects of the telecommunications network represented in FIG. 1, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The transceiver processors TRP 10 of FIG. 1 may in part have a corresponding functionality to a base station or eNodeB of an LTE network, and so the terms TRP and eNodeB in the following description are interchangeable. Base stations, which are an example of radio network infrastructure equipment, may also be referred to as transceiver stations/NodeBs/eNodeBs (eNBs), and so forth. Similarly the communications devices 12 may have a functionality corresponding to devices know for operation with an LTE network and may also be referred to as mobile stations, user equipment (UE), user terminal, mobile radio, communications device, and so forth. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

Figure 2:
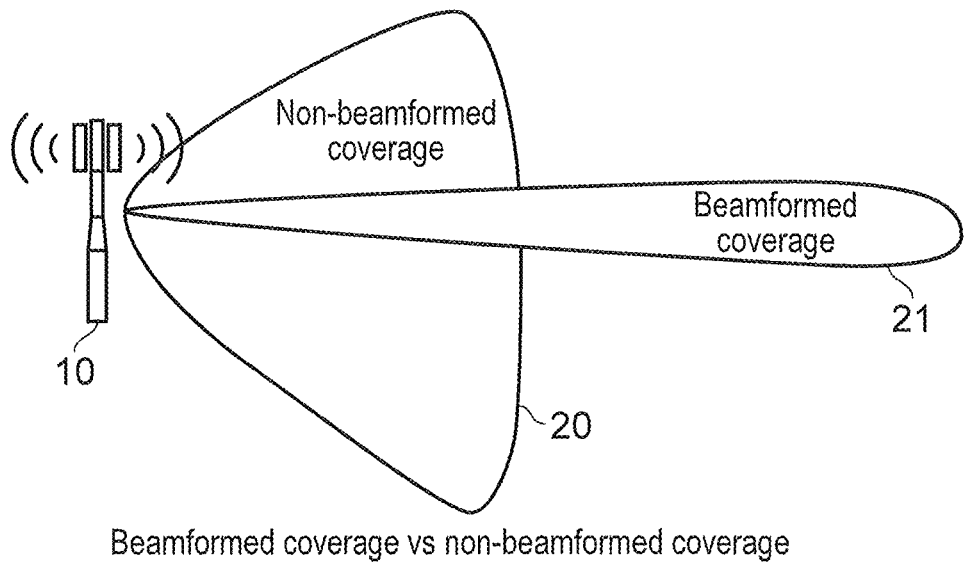
FIG. 2 is a schematic representation illustrating a difference between transmitting signals from a sectorised antenna and signals transmitted as a beam.

Embodiments of the present technique concern an aspect of new radio which is referred to as beam forming. It has been proposed that a wireless communications interface provided to a future wireless communications network may be operating with high frequency carriers such as those within a millimetre waveband, for example with a large frequency range between 20 GHz and 100 GHz to enable a large frequency bandwidth, for example with a few hundred MHz to 1 GHz, to be used offering very high throughput for eMBB services and support large capacity. However, operation in such high frequency bands leads to very high propagation loss leading to small coverage areas of a cell radius within a few tens of meters. One way of overcoming a poor coverage area within a millimetre waveband is to beam form the signal. That is to concentrate the energy of the signal to within a narrow beam, which allows the eNB to reach larger distances. FIG. 2 shows coverage achieved with and without beamforming. A conventional sectorised antenna without beamforming would cover a broad area 20 but with shorter reach whereas using beamforming, the eNB covers a narrow area 21 but reaches larger distances. Since the wavelength of radio waves in the millimetre waveband is small, a large number of antenna elements e.g. 10s to 100s, can be packed into a transmission and reception points (TRP) 10 thereby giving higher flexibility in forming beams (i.e., beams can be very narrow). Accordingly, it is proposed to use beam forming in which radio signals are transmitted from a plurality of antennas which combine coherently in a certain direction and so a signal power within this direction is significantly higher than a signal strength in other directions. Such an arrangement is disclosed by a more detailed representation of components shown in FIG. 1 in FIG. 3.

Figure 3:
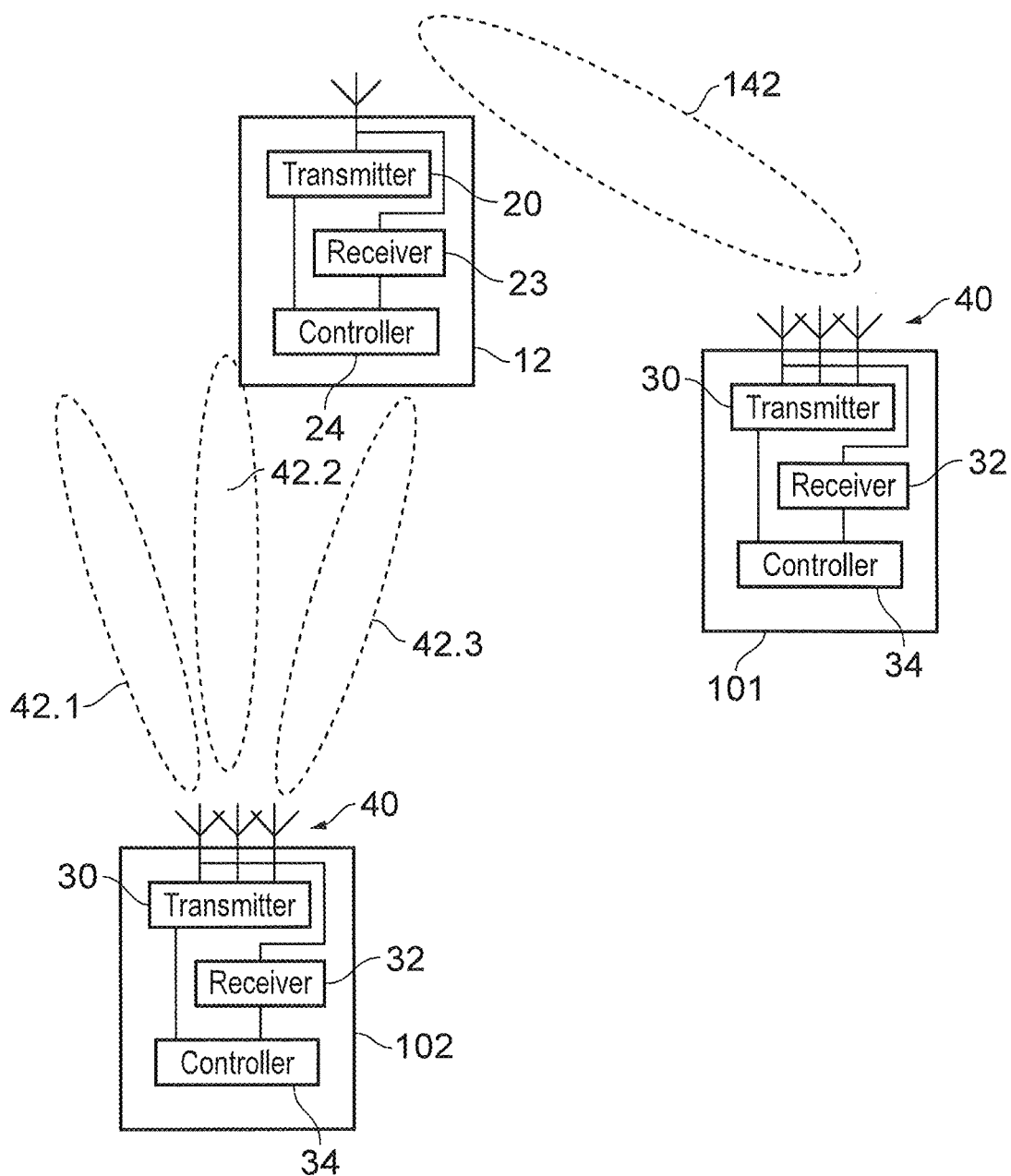
FIG. 3 is a simplified schematic block diagram of radio infrastructure equipment of a wireless communications network shown in FIG. 1 and a communications device illustrating a process of transmitting data as beams of signals.

FIG. 3 provides a representation of a simplified implementation of two of the radio infrastructure equipment or TRP 101, 102 and a communications device or UE 12. As shown in FIG. 3 the communications device 12 includes a transmitter 22, a receiver 23 and a controller 24 which controls the transmitter and the receiver to transmit and receive signals representing data via the wireless access interface to the TRP 101, 102 and from the TRP 101, 102. The TRP correspondingly includes a transmitter 30, a receiver 32 and a controller 34. The transmitter 30 may include analogue and digital circuitry such as radio frequency circuits, analogue amplifiers as well as digital signalling processing software implemented as application specific semiconductor circuits, dedicated signalling processing logic and other processors. Similarly the receiver includes radio frequency circuitry signal processing software in the form of digital signal processors and other devices for detecting signals. The controller 34 is formed from control circuitry including processors executing software, application specific semiconductor circuits or hardware circuits executing digital logic. In some examples the controller can include a so-called "scheduler" which schedules the transmission of signals and the reception of signals via the wireless access interface. Similarly the transmitter 22 and the receiver 23 of the communications device 12 may include analogue as well as digital components, radio frequency filters and transmitters as well as digital signal processing and software controlled processors. The control circuitry controls the transmitter and receiver using software control processors, application specific semiconductor devices or other digital hardware.

As shown in FIG. 3 each of the TRP 101, 102 includes a plurality of antennas 40. In accordance with the present technique the signals transmitted by each of the antennas 40 may be adapted in phase so that the signals add coherently in a particular direction with the effect that a signal strength of the radio signals transmitted in this direction is significantly higher than other directions. Accordingly the antennas in combination with a transmitter 30 can form the radio signals into a plurality of "beams" 42.1, 42.2, 42.3, 142.

Furthermore because of the nature of the transmission of radio signals within a millimetre waveband, the beams 42.1, 42.2, 42.3, 142 may be transmitted to particular communications devices 12 and each of the beams 42.1, 42.2, 42.3, 142 may be identified using some appropriate identifier. In some examples the identifier can be made using reference signals transmitted with the radio signals forming the beam 42. The identifier can additionally be associated with a timing of the transmission of the beams. The radio signals themselves may also include a cell identifier, which identifies the infrastructure equipment or TRP or group of TRPs supporting a cell which transmitted the signals. For this reason the term cell can be used interchangeably with TRP or infrastructure equipment which is operating to provide the cell. As shown in FIG. 3 one of the TRP 101, 102 can transmit a plurality of the beams 42.1, 42.2, 42.3 to the same communications device 12, which can therefore be individually identified. The beams 42.1, 42.2, 42.3 can also be transmitted in a broadcast manner, transmitting information such as synchronisation information, system information etc.

Embodiments of the present technique relate to application of a plurality of beams transmitted by infrastructure equipment such as a TRP 101, 102 to a communications device 12 and a management of mobility and selection of the most appropriate TRP 101, 102 or cell formed by the TRP 101, 102 in dependence upon a number of beams transmitted by the TRP 101, 102.

Figure 4:
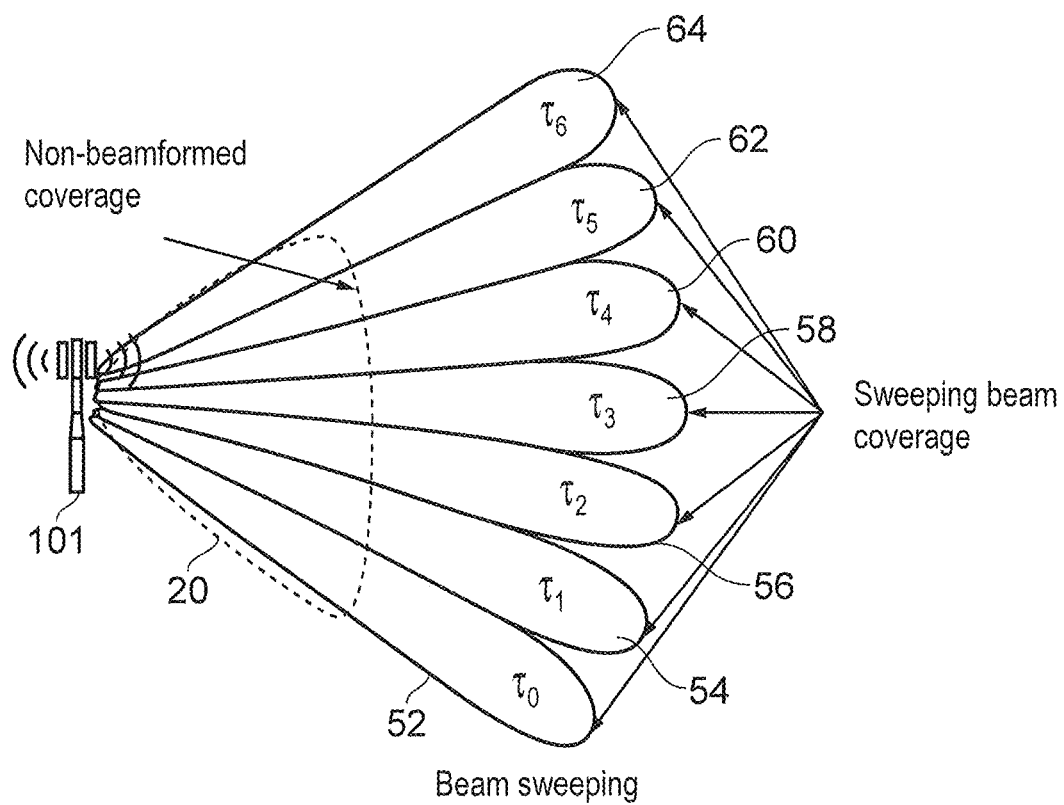
FIG. 4 is a schematic representation illustrating how a beam of signals can be used to transmit data by sweeping the beam through a plurality of different directions.

In conventional networks, beamforming is typically used for UE specific data where the UE feeds back beamforming weights, i.e. pre-coding vectors, to the eNB and the eNB selects a suitable set of precoding weights to form a beam directed towards the UE. This method would only increase the coverage of UE specific data but cannot be used for common channels for common messages such as MIB or SIB. Beam sweeping is proposed in [2] to extend the coverage for common channels, where a beam providing common channels is directed in different angles at different times. An example is shown FIG. 4, where the eNB or TRP 101 directs the beam in the south east direction 52 at time $\tau_0$ and moves the beam in a counter clock wise manner by X° in time until $\tau_1$ and proceeds in this manner for different beam directions 54, 56, 58, 60, 62 until the beam points to the north east direction 64 at time $\tau_6$, after which, the beam sweeping starts again from direction 52. This enables the eNB or TRP 101 to transmit a common channel over a larger area, over a time period, compared to the non-beamformed coverage area 20 as shown in FIG. 2. It will be appreciated that beam sweeping can also be used for UE specific data where the UE 12 is served by one or more sweeping beams.

Due to mobility and changes to radio conditions, a beam serving a UE will change. The change in beam can come from the same eNB or TRP 10, 101, 102 or a different (neighbouring) TRP 10, 101, 102 and hence there is a need to perform beam management in such deployment. If a beam assigned to a UE deteriorates too quickly due to beam switching or sudden changes in radio condition, the UE may face radio link failure leading to interruptions in data transmission/reception. In [4], it is proposed that an alternative beam, which is referred to as a fall back beam is provided to the UE by a TRP for such cases so that the UE can fall back to this alternative beam if the main beam or serving beam fails.

Figure 5:
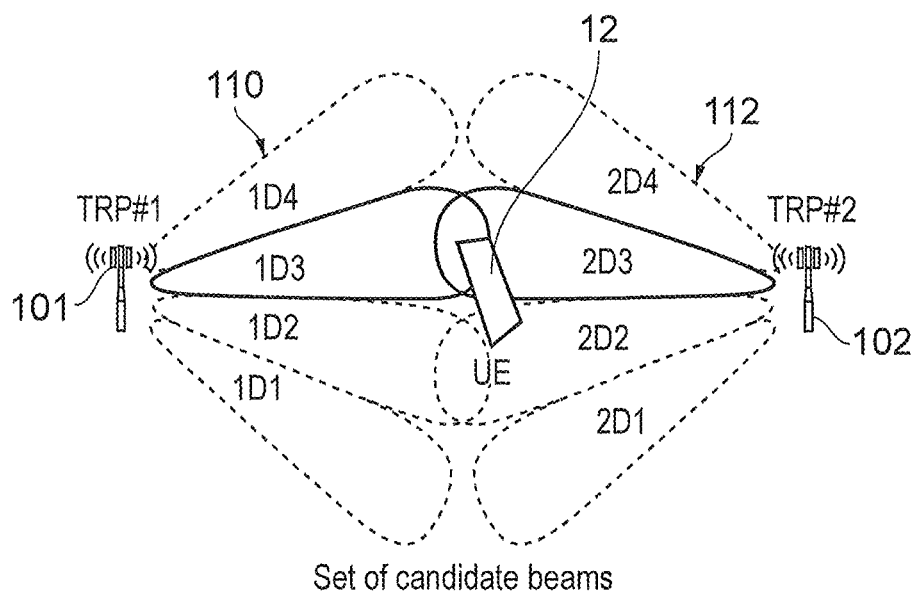
FIG. 5 is a schematic representation illustrating an arrangement in which a set of beams of signals can be used to transmit data to a communications device according to the present technique in which the set of beams includes one or more serving beams and one or more fallback beams.

Embodiments of the present technique can provide an arrangement in which a radio infrastructure equipment provides a set of beams for a communications device (UE), which include a serving beam which is used to transmit data to a communications device (UE) and therefore is currently active and one or more fallback beams, which may be used as an alternative to the serving beam. Subject to predetermined conditions the communications device (UE) can trigger a change from the serving beam to one of the fallback beams from the set of beams. Example embodiments of the present technique are presented in the following paragraphs:

In one example embodiment, a UE 12 is arranged to form one or more fallback beams where a fallback beam is a beam that has a radio quality, for example a signal to noise ratio (SNR), which is above a predetermined (e.g. configured) absolute threshold or relative threshold, that is a threshold determined with respect to the signal to noise ratio of a serving beam. An example is shown in FIG. 5. In FIG. 5, a first and a second TRP 101, 102 are shown to transmit radio signals as beams in a plurality of possible beam directions 110, 112 shown as representations of different possible beams 1D1, 1D2, 1D3, 1D4 and 2D1, 2D2, 2D3, 2D4. As shown in FIG. 5, the UE 12 can "see" three possible beams, namely 1D3 from the first TRP 101 and two other beams 2D2, 2D3 from the second TRP 102. The beams are identified on a basis of, for example, a determined radio quality. For example each of the beams 2D2, 2D3 transmitted 112 from the second TRP 102 and the beam 1D3 transmitted 110 from the first TRP 101 are received by the UE 12 with a radio quality which exceeds a predetermined threshold. One of the beams, for example 1D3 transmitted by the first TRP 101 is the serving beam and the other beams 2D2, 2D3 transmitted by the second TRP 102 are identified as a set of one or more fallback beams.

Identifying a Serving Beam and One or More Fallback Beams

In one example, the fallback beam set is either configured by the network based on the reported beam radio quality measurements, or selected by the UE based on measurements and signalled to the network. The wireless communications network (such as a serving one of the TRP 101, 102) will use one or more of the beams to serve the UE and will fallback to one or more fallback beams if the serving beam or beams fail.

In a connected mode, in which a UE is transmitting data to and/or receiving data from the wireless communications network, the TRP may typically transmit data to or receive data from the UE using unicast beams which are UE specific. That is to say that, the eNB would determine a set of precoding weights for a UE. Hence, if unicast does not use a sweeping beam or beam with fixed and known direction, as in FIG. 5, the UE cannot measure a set of unicast fallback beams since the network has not formed them. Therefore, in another embodiment, the set of fallback beams is based on sweeping beams carrying common control channels. For example in FIG. 5, the first TRP 101 and the second TRP 102 may transmit control channels, which are common to a plurality of the UEs by sweeping the beam. That is to say, that a beam is transmitted in the directions 1D1, 1D2, 1D3, 1D4 and 2D1, 2D2, 2D3, 2D4, from each of the first and second TRPs 101, 102. The UE 12 can then determine the radio conditions of all of these beams 1D1, 1D2, 1D3, 1D4 and 2D1, 2D2, 2D3, 2D4 transmitted from the first and second TRPs 101, 102 and can select one or more of the beams with a radio quality, which exceed a predetermined threshold. That is to say that each of the possible beam directions 1D1, 1D2, 1D3, 1D4 and 2D1, 2D2, 2D3, 2D4 can be selected by sweeping a transmission for each of the beams which are candidate beams, and one of the candidates is selected for as a unicast beam for either the serving beam or the fallback. In one example, therefore the network may identify one or more unicast fallback beams using selected candidate beams, by transmitting signals at each of a plurality of candidate positions 1D1, 1D2, 1D3, 1D4 and 2D1, 2D2, 2D3, 2D4 by sweeping the beams carrying common control channels.

Figure 6:
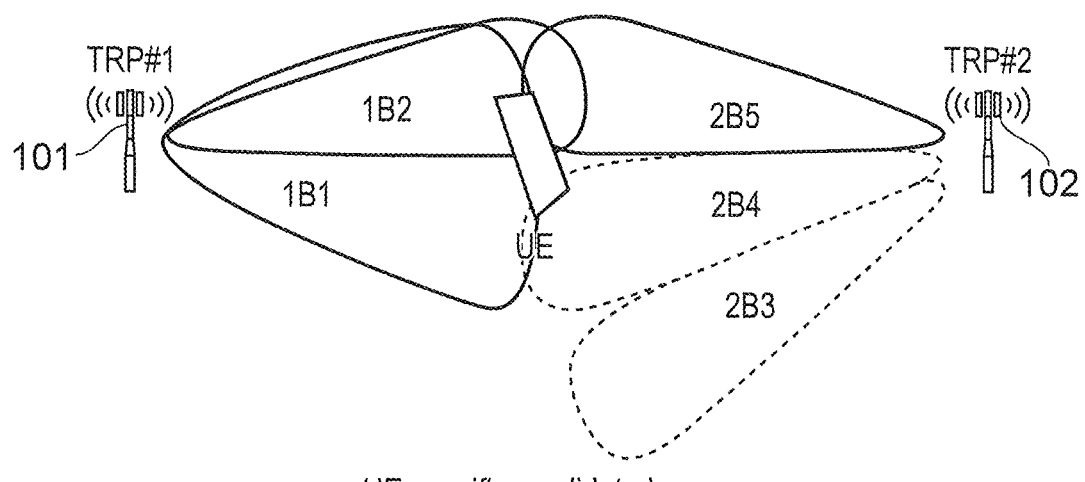
FIG. 6 is a schematic representation illustrating another example arrangement in which a set of beams of signals is used to transmit data to a communications device according to the present technique in which the set of beams includes one or more serving beams and one or more fallback beams.

In another example embodiment, a set of fallback precoding weights are used to form the fallback beams. The network firstly derives some candidate precoding weights. These candidate precoding weights can be derived in a Time Division Duplex (TDD) wireless access interface, in which transmission and reception are performed on the same carrier frequencies. This is because the uplink and the downlink therefore provide reciprocal radio transmission conditions. As such, based on uplink transmissions received by the receiver 32 in the TRP 101, 102, for example, by detecting reference signals transmitted in the uplink transmissions, the controller 24 can form precoding weights based on the received signals which can be used to form a transmitted signal into a beam in a reciprocal direction. The transmitter 30 can be configured then to transmit beams using these candidate precoding weights to the UE and then the TRP 101, 102 can receive a feedback of their radio quality from the UE 12. In one example, the beams can also be transmitted from different TRPs 101, 102. The candidate precoding weights of beams having a radio quality exceeding a threshold would therefore be used for fallback beams. For example in FIG. 6, the network derives a set of candidate precoding weights forming first candidate beams 1B1, 1B2 from a first TRP 101 and second candidate beams 2B3, 2B4, 2B5 from a second TRP 102. The network then transmits some signal or reference symbols using these candidate beams 1B1, 1B2, 2B3, 2B4, 2B5 to the UE 12 and the UE 12 feedbacks to the TRPs 101, 102 an indication of the detected radio quality. In this example, the UE 12 can only detect two beams 1B1, 1B2, 2B4, 2B5 from each of the first and the second TRPs 101, 102 and they are then reported to the network. The network would then form a set of fallback precoding weights that would be used as a set of beams including a serving beam and one or more unicast fallback beams for this UE 12.

In another example embodiment, one or more common channels can be transmitted to the UE using a sweeping beam to indicate a possible set of candidate beams including a serving beam and one or more fallback beams. A UE that can receive a message from one of these common channels would know that if a serving beam fails then it can receive the message from one of the indicated fallback beams. The indication can be a message in a system information block (SIB) broadcast to a plurality of UEs or coded in a physical layer such that if the UE is able to decode from the received beam information it should be able to decode the identity of fallback beams as well.

In an embodiment, the UE blind decodes beams in a set of beams comprising both the serving beam and the fallback beams. If the UE does not receive a transmission targeted at it in the serving beam, it then attempts to decode the transmission using the fallback beam. The serving beam and fallback beams may be differentiated by having different reference signal sequences or different scrambling codes applied to them. Hence the act of blind decoding the different beams can comprise the receiver 23 in the UE 12 attempting to decode with different hypotheses of reference signal sequence or different hypotheses of scrambling code.

Conditions for Triggering a Switch from a Serving Beam to One or More of the Fallback Beams Embodiments of the present technique can provide an arrangement for triggering a switch from a serving beam to one of the one or more fallback beams. In one example embodiment, the trigger to use fallback beams is based on a number of hybrid automatic repeat requests HARQ or automatic repeat requests ARQ retransmissions, that is, when the number of (H)ARQ retransmissions reaches a predetermined number after a negative acknowledgement of successful receipt (NACK), the data can be retransmitted on one or more fallback beams from the identified set of beams. This can be arranged for transmission of data from the wireless communications network to the UE or from the UE to the wireless communications network. The receiver (whether on the UE or the TRP/eNodeB) may correspondingly switch to try to receive the signal from one or more of the fallback beams. The one or more fallback beams used can be signalled to the receiver (UE or TRP/eNodeB) in an earlier transmission or the receiver 23 in the UE 12 can attempt to blind decode each of the fallback beams until the receiver 23 in the UE 12 positively detects that one or more of the fallback beams are being used to transmit data. Correspondingly, the controller 24 in the UE 12 or the controller 30 in the TRP 101, 102 can be configured to detect a number of NACKs sent for a serving beam, and if this number exceeds a predetermined number, then the controller will know that the transmitting TRP 101, 102 or the transmitting UE 12 will switch to one of the fallback beams. For example, the network can configure the threshold HARQ retransmission to be two. If after two HARQ retransmissions the UE still feedbacks a NACK (i.e. an ACK is not received at the TRP), then the network would retransmit the data in the fallback beams. The UE can receive the data in multiple beams and combine or receive using only one of the fallback beams.

In another example embodiment, the TRP 101, 102 of the wireless communications network can be configured so that the number of fallback beams used by the network is proportional to the number of HARQ retransmission. For example in a first transmission, the network transmits data using a serving beam. In a subsequent retransmission, the network transmits data using the serving beam and one of the fallback beams. After a third retransmission, the network would transmit the message over the serving beam and two of the fallback beams. If there are only two fallback beams then after a fourth retransmission, the TRP 101, 102 which transmit the data on a maximum number of fallback beams. That is to say that in this example it would be the same as those used in the example after a third retransmission, namely the serving beam and two fallback beams.

In another example embodiment, when a UE chooses to use a fallback beam (through one of the methods described previously), it signals the fallback beam used to the eNodeB. The eNodeB then reconfigures that beam to be the serving beam and the previous serving beam to be a fallback beam.

OTHER EXAMPLE EMBODIMENTS

In another example embodiment, a TRP 101, 102 (or eNodeB) can send a periodic signal to the UE to form the serving and fallback beams. For example a dedicated channel carrying voice traffic or power control/timing advance control to the UE can be transmitted to a UE using different periodic signals to form a serving beam then one or more fallback beams. If the UE does not receive the dedicated channel from the serving beam using these periodic signals, then the UE will start additional searching for these signals on a fallback beam, which may also be a periodic.

In one example embodiment, the phases of the periodic signals on the serving and fallback beams are different. For example, the periodic signals sent on the serving beam are transmitted every 'n' subframe in a frame whereas the periodic signal on one or more fallback beams are sent in every 'n+1'th subframe in a frame. This arrangement has an advantage in that the UE does not need to decode both the serving beam and fallback beam at the same time.

In some examples, the UE may start to monitor the periodic signals on the fallback beams following a quality measurement on the serving beam. An example of the quality measurement could be the signal to noise ratio of the serving beam, or the number of times within a time window that the periodic signal is not received.

In another example embodiment, the UE monitors a serving beam transmitted on the downlink and then transmits using a serving beam on the uplink. If the TRP or eNodeB does not receive signals from the UE on the uplink serving beam, then the TRP sends a message to the UE causing the UE to start monitoring fallback beams. This message which is sent from the TRP or eNodeB could be transmitted from more than one TRP on the same frequency if for example the wireless communications network is configured as an SFN (single frequency network) message. A skilled artisan will be aware that a message sent in an SFN mode has a greater coverage than a message sent without SFN.

In other examples a beam set can be formed by the wireless communications network based on measurements by the wireless communications network of uplink reference signals and signalled to the UE.

The predetermined conditions for switching one or more of the fallback beams to be a serving beam can include one or more of:
    detecting an indication of a radio link failure;
    detecting an indication that there is a loss of synchronization with a downlink beam;
    the communications device (UE) can switch to a fallback beam if one or more random access preamble or message retransmissions are unsuccessful.

Summary of Operation

As explained above, embodiments of the present technique can provide an arrangement in which a communications device can identify a set of beams for receiving data transmitted from a wireless communications network. The set of beams comprises one or more serving beams which are used to transmit data to the communications device and one or more fallback beams which can be used instead of one or more of the serving beams or in addition to the one of more serving beams when predetermined conditions are satisfied. The one or more serving beams and the one or more fallback beams may be formed from different cells of the wireless communications network. The predetermined conditions may include performing measurements to evaluated signals received from the one or more serving beams and/or the one or more fall-back beams, such as comparing the evaluated signals (RSRP or RSRQ) with a predetermined threshold.

Figure 7:
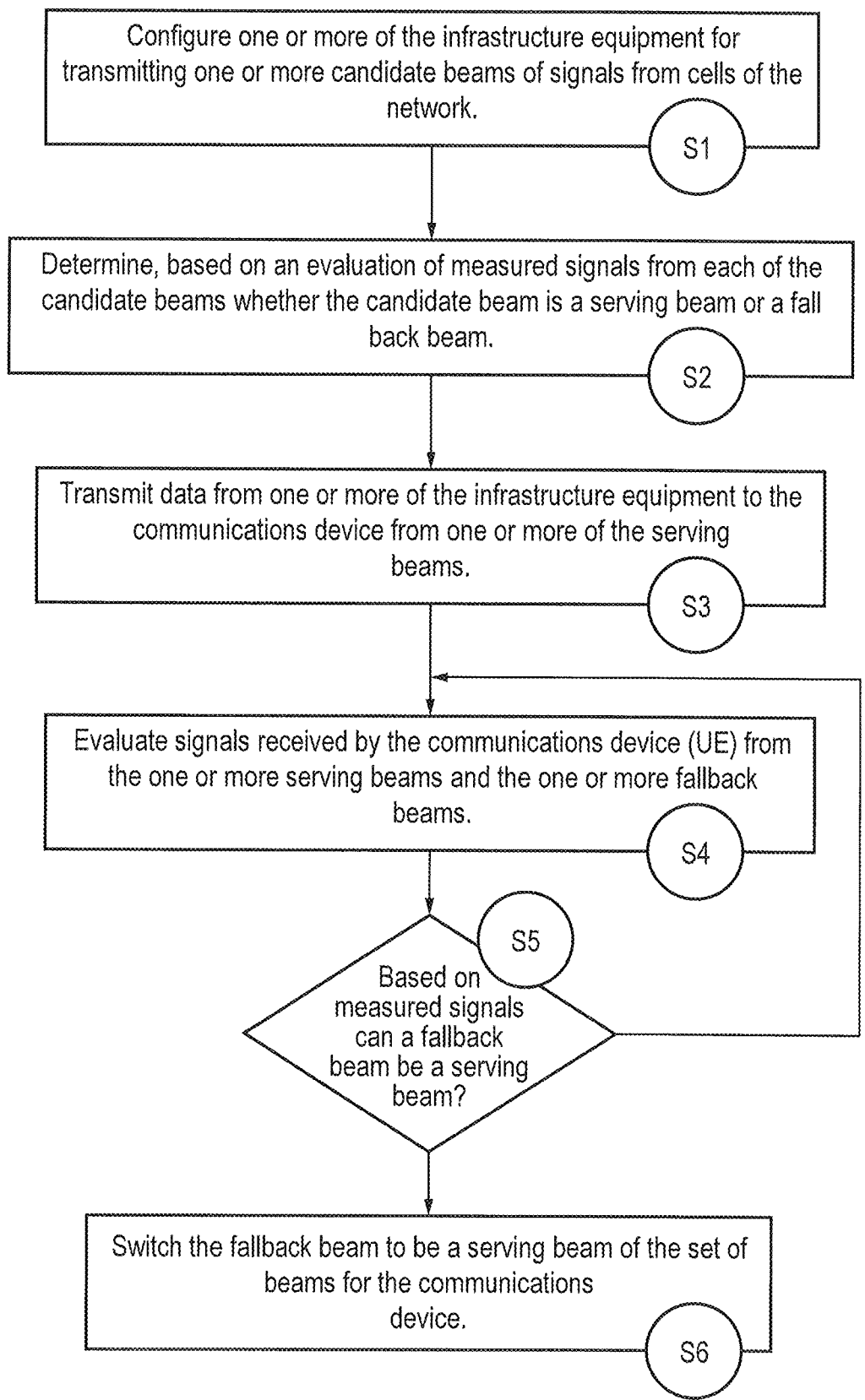
FIG. 7 is an example flow diagram illustrating an example operation of a wireless communications network according to an example embodiment.

FIG. 7 provides a flow diagram representing a summary of operation of the wireless communications network, the infrastructure equipment and the communications device. FIG. 7 is summarised as follows:

S1: One or more infrastructure equipment of the wireless communications network are configured for transmitting one or more candidate beams of signals which can be used to transmit the data to the communications device from each of one or more cells of the wireless communications device formed by the infrastructure equipment. Each of the candidate beams is configured with a different directional bias with respect to a location of the one or more cells from which the signals of the candidate beam can be received when transmitted.

S2: Each of the one or more infrastructure equipment in combination with the communications device determine whether each of the one or more candidate beams is to form either a serving beam with which the data can be transmitted by one or more of the infrastructure equipment to be received by the communications device or a fallback beam from which the data can be transmitted by the infrastructure equipment and received by the communications device instead of or in addition to one or more serving beams.

S3: Data is transmitted to the communications device from one or more of the infrastructure equipment from the one or more serving beams provided by one or more of the infrastructure equipment.

S4: The communications device then performs measurements to evaluate the signals received from the one or more serving beams and/one or more of the fallback beams or determines the number of transmission/retransmission of the signal or falls out of synchronisation.

S5: Based on the measurements for evaluating the signals of each of the beams in the set of beams provided to the communications device, or the number of retransmissions, or a detected failed synchronisation the communications device or the wireless communications network determines whether one of the fallback beams should replace one of the serving beams or be used in combination with the serving beams. If no then processing proceeds back to step S4.

S6: If yes, then the fallback beam is used as a serving beam.

As explained above, although the example embodiments have been described with reference to a UE receiving data transmitted on the down-link, embodiments of the present technique can equally be applied to the uplink transmissions from the UE to the wireless communications network, with a corresponding reciprocal reversal of the operations of the roles of the transmitter and the receiver circuitry.

Various features of embodiments of the present technique are defined by the following numbered clauses.

It will be appreciated that numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The following numbered paragraphs provide further example aspects and features of the present technique:

Paragraph 1. A communications device for transmitting data to or receiving data from a wireless communications network, the communications device comprising
transmitter circuitry configured to transmit signals to one or more infrastructure equipment of the wireless communications network via a wireless access interface provided by the one or more infrastructure equipment,
receiver circuitry configured to receive signals from one or more of the infrastructure equipment via the wireless access interface, and
controller circuitry configured to control the transmitter circuitry and the receiver circuitry to transmit or to receive the signals representing data, the control circuitry being configured in combination with the receiver circuitry and the transmitter circuitry
to form a set of beams from which data can be received from the wireless communications network from a plurality of candidate beams of signals which can be used by the receiver circuitry to receive data transmitted by the one or more infrastructure equipment from one or more of the cells or which can be used by the transmitter circuitry to transmit data to one or more cells of the wireless communications network, each of the candidate beams having a directional bias with respect to a location of the cell from which the signals of the candidate beam can be received or transmitted, wherein, the set of beams comprises one or more serving beams from which the data transmitted by the wireless communications network is received by the receiver of the communications device or transmitted by the communications device and received by the wireless communications network, and one or more fallback beams from which the data can be transmitted by the wireless communications network or received by the receiver of the communications device or transmitted by the transmitter circuitry, and in accordance with predetermined conditions to switch one or more of the fallback beams to be one of the serving beams.

Paragraph 2. A communications device according to Paragraph 1, wherein the one or more serving beams which are switched with the one or more fallback beams become one or more of the fallback beams of the set of beams in accordance with the evaluated signals.

Paragraph 3. A communications device according to Paragraph 1 or 2, wherein the controller circuitry is configured in combination with the receiver circuitry to form the candidate beams for receiving data transmitted from the wireless communications network into the set of beams for receiving by performing measurements for evaluating signals from the plurality of candidate beams, the one or more fallback beams or the one or more serving beams being selected from the evaluated signals of the plurality of candidate beams by comparing the evaluated signals for each of the plurality of candidate beams with a predetermined selection threshold.

Paragraph 4. A communications device according to Paragraph 3, wherein the controller is configured in combination with the receiver to form the candidate beams into the set of beams by performing measurements for evaluating signals received from the plurality of candidate beams, the one or more fallback beams being selected from the evaluated signals of the plurality of candidate beams if a difference between an evaluated signal of the candidate beam and an evaluated signal of the one or more serving beams is less than a predetermined selection threshold.

Paragraph 5. A communications device according to Paragraph 3 or 4, wherein the controller is configured in combination with the transmitter and the receiver to transmit an indication of the evaluated signals of each of the candidate beams to the wireless communications network and to receive, in response, an indication of the one or more fallback beams and the one or more serving beams from the wireless communications network.

Paragraph 6. A communications device according to any of Paragraphs 1 to 5, wherein the controller is configured in combination with the receiver to identify the set of beams comprising the one or more serving beams and the one or more fallback beams for receiving the data from the wireless communications network or for transmitting the data to the wireless communications network by receiving one or more control channels received as beams transmitted in a plurality of directions from the one or more cells, the set of beams being identified from an evaluated signal quality of the received one or more control channels at a plurality of transmitted locations.

Paragraph 7. A communications device according to any of Paragraphs 1 to 5, wherein the wireless access interface comprises at least one radio frequency carrier divided in time between signals which can be transmitted by the communications device and signals which can be received by the communications device from the wireless communications network in accordance with a time division duplex scheme, and the controller is configured in combination with the transmitter and the receiver to identify the set of beams comprising the one or more serving beams and the one or more fallback beams for receiving the data from the wireless communications network or for transmitting the data to the wireless communications network by receiving signals transmitted from the one or more cells as beams at a plurality of directions from the one or more cells as the candidate beams, evaluating a signal quality of the signals received as the candidate beams, transmitting an indication of the evaluated signal quality of the candidate beams to the wireless communications network, and receiving in response an indication of the set of beams comprising one or more serving beams and one or more fallback beams from the indication of the evaluated signal quality of the candidate beams for receiving the data from the infrastructure equipment, or transmitting signals to one or more of the plurality of infrastructure equipment forming the one or more cells as beams at a plurality of directions, receiving in response an indication of the set of beams comprising one or more serving beams and one or more fallback beams from the indication of the evaluated signal quality of the candidate beams for transmitting the data to the infrastructure equipment.

Paragraph 8. A communications device according to any of Paragraphs 1 to 5, wherein the controller is configured in combination with the receiver to attempt to decode signals which may have been transmitted from one or more of the cells as one or more of the serving beams and one or more of the fallback beams, and the predetermined conditions for switching one or more of the fallback beams to one or more of the serving beams, include the receiver being unable to decode signals received from one or more of the serving beams and being able to decode signals received from one or more of the fallback beams.

Paragraph 9. A communications device according to any of Paragraphs 1 to 8, wherein the controller is configured in combination with the transmitter and the receiver to receive data from the one or more serving beams in accordance with an automatic repeat request type protocol in which the data is received as data units transmitted from the wireless communications network, to transmit an acknowledgement if a data unit is received successfully or a negative acknowledgement if the data unit is not received, and to receive in response to a negative acknowledgement a re-transmission of a data unit not received, or to transmit data to the one or more serving beams in accordance with an automatic repeat request type protocol in which the data is transmitted as data units to the wireless communications network, to receive an acknowledgement if a data unit is received successfully or a negative acknowledgement if the data unit is not received, and to re-transmit in response to a negative acknowledgement of a data unit not received, and the predetermined conditions for switching one or more of the fallback beams to be one of the serving beams is based on the number of retransmissions received.

Paragraph 10. A communications device according to Paragraph 9, wherein the predetermined conditions for switching one or more of the fallback beams to be one of the serving beams includes whether the number of retransmissions exceeds a predetermined number.

Paragraph 11. A communications device according to Paragraph 10, wherein the controller is configured in combination with the transmitter and the receiver to switch a number of the fallback beams to become serving beams to increase the number of serving beams in proportion to the number of retransmissions received.

Paragraph 12. A communications device according to any of Paragraphs 1 to 11, wherein the predetermined conditions for switching the one or more fallback beams to become one or more serving beams includes comparing evaluated signal measurements of one or more of the fallback beams with one or more of the serving beams.

Paragraph 13. A communications device according to any of Paragraphs 1 to 11, wherein the predetermined conditions for switching the one or more fallback beams to become one or more serving beams includes detecting a radio link failure, a loss of synchronisation for receiving data from the wireless communications network or if one or more random access transmissions are unsuccessful.

Paragraph 14. A communications device according to any of Paragraphs 1 to 11, wherein the controller is configured in combination with the receiver to receive the signals from one or both of one of the serving beams or one of the fallback beams as periodically transmitted signals, or to transmit the signals from one or both of one of the serving beams or one of the fallback beams as periodically transmitted signals, a phase of the periodically transmitted signals from the serving beam being different to that of the fallback beam.

Paragraph 15. An infrastructure equipment for forming part of a wireless communications network for transmitting data to or receiving data from communications devices, the infrastructure equipment comprising transmitter circuitry configured to transmit signals to one or more of the communications devices of the wireless communications network via a wireless access interface formed by the wireless access interface to form a cell of the wireless access interface, receiver circuitry configured to receive signals from one or more of the communications devices via the wireless access interface, and controller circuitry configured to control the transmitter circuitry and the receiver circuitry to transmit or to receive the signals representing data, the control circuitry being configured in combination with the receiver circuitry and the transmitter circuitry to configure the transmitter circuitry for transmitting one or more candidate beams of signals which can be used by the transmitter circuitry to transmit the data to one of the communications devices, or to configure the receiver circuitry for receiving one or more candidate beams of signals which can be used by the receiver circuitry to receive the data from one of the communications devices, each of the candidate beams being configured with a different directional bias with respect to a location of the cell from which the signals of the candidate beam can be received when transmitted or to which the signals of the candidate beam can be received when transmitted, and to determine whether each of the one or more candidate beams is to form either a serving beam with which the data can be transmitted by the transmitter circuitry to be received by the communications device, or from which the data can be received by the receiver circuitry from the communications device or a fallback beam from which the data can be transmitted by the transmitter circuitry and received by the communications device instead of or in addition to one or more serving beams or a fallback beam from which the data can be received by the receiver circuitry when transmitted by the communications device instead of or in addition to one or more serving beams.

Paragraph 16. An infrastructure equipment according to Paragraph 15, wherein the controller circuitry is configured in combination with the receiver circuitry to receive evaluated signal measurements for one or more of the candidate beams from the communications device, and to determine whether the one or more candidate beams should become the one or more serving beams or the one or more fallback beams based on the evaluated signal measurements received from the communications device, or to transmit evaluated signals measurements for one or more of the candidate beams to the communications device based on signals received from the communications device via the one or more candidate beams, and to receive an indication that the one or more candidate beams should become the one or more serving beams or the one or more fallback beams from the communications device based on the transmitted evaluated signal measurements.

Paragraph 17. An infrastructure equipment according to Paragraph 16, wherein the controller is configured in combination with the receiver circuitry or the transmitter circuitry to identify one or more of the candidate beams as a fallback beam or a serving beam by comparing the received evaluated signal measurements for each of the plurality of candidate beams with a predetermined selection threshold.

Paragraph 18. An infrastructure equipment according to Paragraph 17, wherein the controller is configured in combination with the receiver circuitry or the transmitter circuitry to identify one or more fallback beams from the one or more candidate beams if a difference between the received evaluated signal measurements of the candidate beam and an evaluated signal measurement of a serving beams is less than a predetermined selection threshold.

Paragraph 19. An infrastructure equipment according to any of Paragraphs 15 to 18, wherein the controller circuitry is configured in combination with the transmitter circuitry to transmit an indication to the communications device that one of the candidate beams is a fall back beam or one of the candidate beams is a serving beam for the communications device.

Paragraph 20. An infrastructure equipment according to any of Paragraphs 16 to 19, wherein the controller circuitry is configured in combination with the transmitter circuitry and the receiver circuitry
- to transmit signals using each of the one or more candidate beams to the communications device, and
- in response to receive the evaluated signal measurements from the communications device representing the signals received by the communications device from at least one of the candidate beams.

Paragraph 21. An infrastructure equipment according to Paragraph 20, wherein the signals transmitted or received using each of the candidate beams are known reference signals.

Paragraph 22. An infrastructure equipment according to Paragraph 20, wherein the signals transmitted using each of the candidate beams are generated from one or more common control channels transmitting control information which is common to the communications device and at least one other communications device.

Paragraph 23. An infrastructure equipment according to any of Paragraphs 16 to 22, wherein the wireless access interface comprises at least one radio frequency carrier divided in time between signals which can be transmitted by the communications device and signals which can be received by the communications device from the wireless communications network in accordance with a time division duplex scheme, and the controller circuitry is configured in combination with the transmitter circuitry and the receiver circuitry to form each of the candidate beams by
- receiving signals transmitted by the communications device on an uplink,
- identifying, for each candidate beam, a plurality of precoded weights to be applied to a plurality of antennas, so that when signals are transmitted from the antennas, the signals are formed into a directional beam.

Paragraph 24. An infrastructure equipment according to any of Paragraphs 15 to 23, wherein the controller circuitry is configured in combination with the transmitter circuitry and the receiver circuitry to switch one of the fallback beams to be a serving beams in accordance with predetermined conditions.

Paragraph 25. An infrastructure equipment according to Paragraph 24, wherein the one or more serving beams which are switched with the one or more fallback beams become one or more of the fallback beams in accordance with the received evaluated signal measurements.

Paragraph 26. An infrastructure equipment according to Paragraph 24 or 25, wherein the predetermined conditions for switching one of the fallback beams to be a serving beam include whether an evaluated signal measurement for the fallback beam exceeds that for one or more serving beams of a set of beams used by the communications device to receive data.

Paragraph 27. An infrastructure equipment according to Paragraph 24 or 25, wherein the data is transmitted using one or more one or more of the serving beams or received from one or more of the serving beams in accordance with an automatic repeat request type protocol in which the data is transmitted or received as data units transmitted from the wireless communications network or received by the infrastructure equipment, for which the communications device or the infrastructure equipment transmits either an acknowledgement if a data unit is received successfully or a negative acknowledgement if the data unit is not received, and the controller circuitry is configured in combination with the transmitter circuitry and the receiver circuitry
- to detect one or more negative acknowledgements or one or more retransmissions of data units not received by the communications device or by the receiver circuitry, and the predetermined conditions for switching one or more of the fallback beams to be one of the serving beams is based on the number of retransmissions received.

Paragraph 28. An infrastructure equipment according to Paragraph 27, wherein the predetermined conditions for switching one or more of the fallback beams to be one of the serving beams includes whether the number of retransmissions exceeds a predetermined number.

Paragraph 29. An infrastructure equipment according to Paragraph 28, wherein the controller circuitry is configured in combination with the transmitter and the receiver to switch a number of the fallback beams to become serving beams to increase the number of serving beams in proportion to the number of retransmissions received.

Paragraph 30. An infrastructure equipment according to any of Paragraphs 15 to 29, wherein the controller circuitry is configured in combination with the transmitter circuitry to transmit the signals from one or both of one of the serving beams or one of the fallback beams as periodically transmitted signals, a phase of the periodically transmitted signals from the serving beam being different to that of the fallback beam.

Paragraph 31. A method of receiving data at a communications device from a wireless communications network or transmitting data from the communications device to the wireless communications network, the method comprising
- forming a set of beams from which data can be received from the wireless communications network from a plurality of candidate beams of signals which can be used to receive data transmitted by the one or more infrastructure equipment or which can be used to transmit data to one or more cells of the wireless communications network, each of the candidate beams having a directional bias with respect to a location of the cell from which the signals of the candidate beam can be received or transmitted, wherein the set of beams comprises one or more serving beams from which the data transmitted by the wireless communications network is received by the communications device or transmitted by the communications device for reception by the wireless communications network, and one or more fallback beams from which the data can be transmitted by the wireless communications network for reception by the communications device or transmitted by the communications device, and in accordance with predetermined conditions switching one or more of the fallback beams to be one of the serving beams.

Paragraph 32. A method of controlling an infrastructure equipment forming part of a wireless communications network for transmitting data to a communications device, the method comprising configuring the infrastructure equipment for transmitting one or more candidate beams of signals which can be used to transmit the data to one of the communications devices from a cell of the wireless communications device formed by the infrastructure equipment or receiving one or more candidate beams of signals which can be used to receive the data from one of the communications devices, each of the candidate beams being configured with a different directional bias with respect to a location of the cell from which the signals of the candidate beam can be received when transmitted or to which the signals of the candidate beam can be received when transmitted, and determining whether each of the one or more candidate beams is to form either a serving beams with which the data can be transmitted by the infrastructure equipment to be received by the communications device or a fallback beams from which the data can be transmitted by the infrastructure equipment and received by the communications device instead of or in addition to one or more serving beams.

Paragraph 33. A method according to Paragraph 32, comprising switching one of the fallback beams to be a serving beams in accordance with predetermined conditions.

Paragraph 34. A method according to Paragraph 32 or 33, comprising switching one or more serving beams with the one or more fallback beams to become one or more of the fallback beams in accordance with received evaluated signal measurements of one or both of the one or more of the fallback beams or the serving beam.

Paragraph 35. A method of transmitting data to a communications device from a wireless communications network comprising one or more infrastructure equipment forming, the method comprising configuring one or more of the infrastructure equipment for transmitting one or more candidate beams of signals which can be used to transmit the data to the communications device from each of one or more cells of the wireless communications device formed by the infrastructure equipment, each of the candidate beams being configured with a different directional bias with respect to a location of the one or more cells from which the signals of the candidate beam can be received when transmitted, determining whether each of the one or more candidate beams is to form either a serving beam with which the data can be transmitted by one or more of the infrastructure equipment to be received by the communications device or a fallback beams from which the data can be transmitted by the infrastructure equipment and received by the communications device instead of or in addition to one or more serving beams, and in accordance with predetermined conditions switching one of the fallback beams to be a serving beams.

REFERENCES

[1] Holma H. and Toskala A, "LTE for UMTS OFDMA and SC-FDMA based radio access", John Wiley and Sons, 2009

[2] RP-160671, "New SID Proposal: Study on New Radio Access Technology," NTT DOCOMO, RAN #71

[3] R1-165364, "Support for Beam Based Common Control Plane", Nokia, Alcatel-Lucent Shanghai Bell, RAN1 #85

[4] R2-166391 "DL Beam Management in the Multi-Beam based NR system," Samsung, RAN2 #95bis

The invention claimed is:

1. A communications device for transmitting data to or receiving data from a wireless communications network, the communications device comprising:

transmitter circuitry configured to transmit signals to one or more infrastructure equipment of the wireless communications network via a wireless access interface provided by the one or more infrastructure equipment;

receiver circuitry configured to receive signals from the one or more of the infrastructure equipment; and controller circuitry configured to control the transmitter circuitry and the receiver circuitry to transmit or to receive the signals representing data, the control circuitry being configured in combination with the receiver circuitry and the transmitter circuitry to form a set of beams from which data is received from the wireless communications network from a plurality of candidate beams of signals used by the receiver circuitry to receive data transmitted by the one or more infrastructure equipment from one or more of the cells of the wireless communications network or used by the transmitter circuitry to transmit data to the one or more cells, wherein each candidate beam of the plurality of candidate beams has a directional bias with respect to a location of a cell from which signals of the candidate beam are received or transmitted, and the set of beams comprises one or more serving beams and one or more fallback beams; and switch, in accordance with predetermined conditions, a fallback beam of the one or more fallback beams to be one of the one or more serving beams.

2. The communications device according to claim 1, wherein the data is received by the receiver circuitry or transmitted by the transmitter circuitry via the one or more serving beams.

3. The communications device according to claim 1, wherein the data is received by the receiver circuitry or transmitted by the transmitter circuitry via the one or more fallback beams.

4. The communications device according to claim 1, wherein the controller circuitry is further configured in combination with the receiver circuitry to identify the set of beams by receiving one or more control channels received as beams transmitted in a plurality of directions from the one or more cells, the set of beams being identified from an evaluated signal quality of the received one or more control channels.

5. The communications device according to claim 1, wherein each beam of the plurality of candidate beams has a different directional bias.

6. The communications device according to claim 1, wherein to form the set of beams, the control circuitry is configured in combination with the receiver circuitry and the transmitter circuitry to perform a beam sweeping operation to cover the cell, the beam sweeping operation including transmitting and/or receiving beams during a time period.

7. The communications device according to claim 1, wherein in a case that beam failure is detected, the control circuitry is configured in combination with the receiver circuitry and the transmitter circuitry to use the one or more fallback beams to perform beam failure recovery.

8. The communications device according to claim 1, wherein the control circuitry is configured in combination with the receiver circuitry and the transmitter circuitry to detect beam failure.

9. The communications device according to claim 8, wherein a counter for beam failure instance is used to detect the beam failure.

10. The communications device according to claim 9, wherein the counter is incremented in a case that a periodic signal is not received.

11. The communications device according to claim 9, wherein the counter is reset after expiration of a time window.

12. An infrastructure equipment of a wireless communications network for transmitting data to or receiving data from communications devices, the infrastructure equipment comprising:
   transmitter circuitry configured to transmit signals to one or more of the communications devices via a wireless access interface which forms a cell of the wireless communications network;
   receiver circuitry configured to receive signals from the one or more of the communications devices via the wireless access interface; and
   controller circuitry configured to control the transmitter circuitry and the receiver circuitry to transmit or to receive the signals representing data, the control circuitry being configured in combination with the receiver circuitry and the transmitter circuitry to
      transmit one or more candidate beams of signals used by the transmitter circuitry to transmit the data to one of the communications devices, or receive the one or more candidate beams of signals used by the receiver circuitry to receive the data from one of the communications devices, wherein each candidate beam of the one or more candidate beams has a directional bias with respect to a location of a cell from which the signals of the candidate beam are received or transmitted; and
      determine whether each candidate beam of the one or more candidate beams is to form one or more serving beams or one or more fallback beams, with which the data can be transmitted or received from the communications device.

13. The infrastructure equipment according to claim 12, wherein the control circuitry being configured in combination with the receiver circuitry and the transmitter circuitry to switch, in accordance with predetermined conditions, a fallback beam of the one or more fallback beams to be one of the one or more serving beams.

14. The infrastructure equipment according to claim 12, wherein the data is received by the receiver circuitry or transmitted by the transmitter circuitry via the one or more serving beams.

15. The infrastructure equipment according to claim 12, wherein the data is received by the receiver circuitry or transmitted by the transmitter circuitry via the one or more fallback beams.

16. The infrastructure equipment according to claim 12, wherein the controller circuitry is further configured in combination with the receiver circuitry to identify the set of beams by receiving one or more control channels received as beams transmitted in a plurality of directions from the one or more cells, the set of beams being identified from an evaluated signal quality of the received one or more control channels.

17. The infrastructure equipment according to claim 12, wherein each beam of the plurality of candidate beams has a different directional bias.

18. The infrastructure equipment according to claim 12, wherein in a case that beam failure is detected, the one or more fallback beams is used to perform beam failure recovery.

19. The infrastructure equipment according to claim 12, wherein the control circuitry is configured in combination with the receiver circuitry and the transmitter circuitry to detect beam failure.

20. A method of controlling an infrastructure equipment of a wireless communications network for transmitting data to or receiving data from communications devices, the method comprising:
   transmitting signals to one or more of the communications devices via a wireless access interface which forms a cell of the wireless communications network or receiving signals from the one or more of the communications devices via the wireless access interface;
   transmitting one or more candidate beams of signals to transmit the data to one of the communications devices or receiving the one or more candidate beams of signals to receive the data from one of the communications devices, wherein each candidate beam of the one or more candidate beams has a directional bias with respect to a location of a cell from which the signals of the candidate beam are received or transmitted; and
   determining whether each candidate beam of the one or more candidate beams is to form one or more serving beams or one or more fallback beams, with which the data can be transmitted or received from the communications device.

* * * * *